April 21, 1931. W. W. KNIGHT 1,802,176
GASKET
Filed Sept. 10, 1927
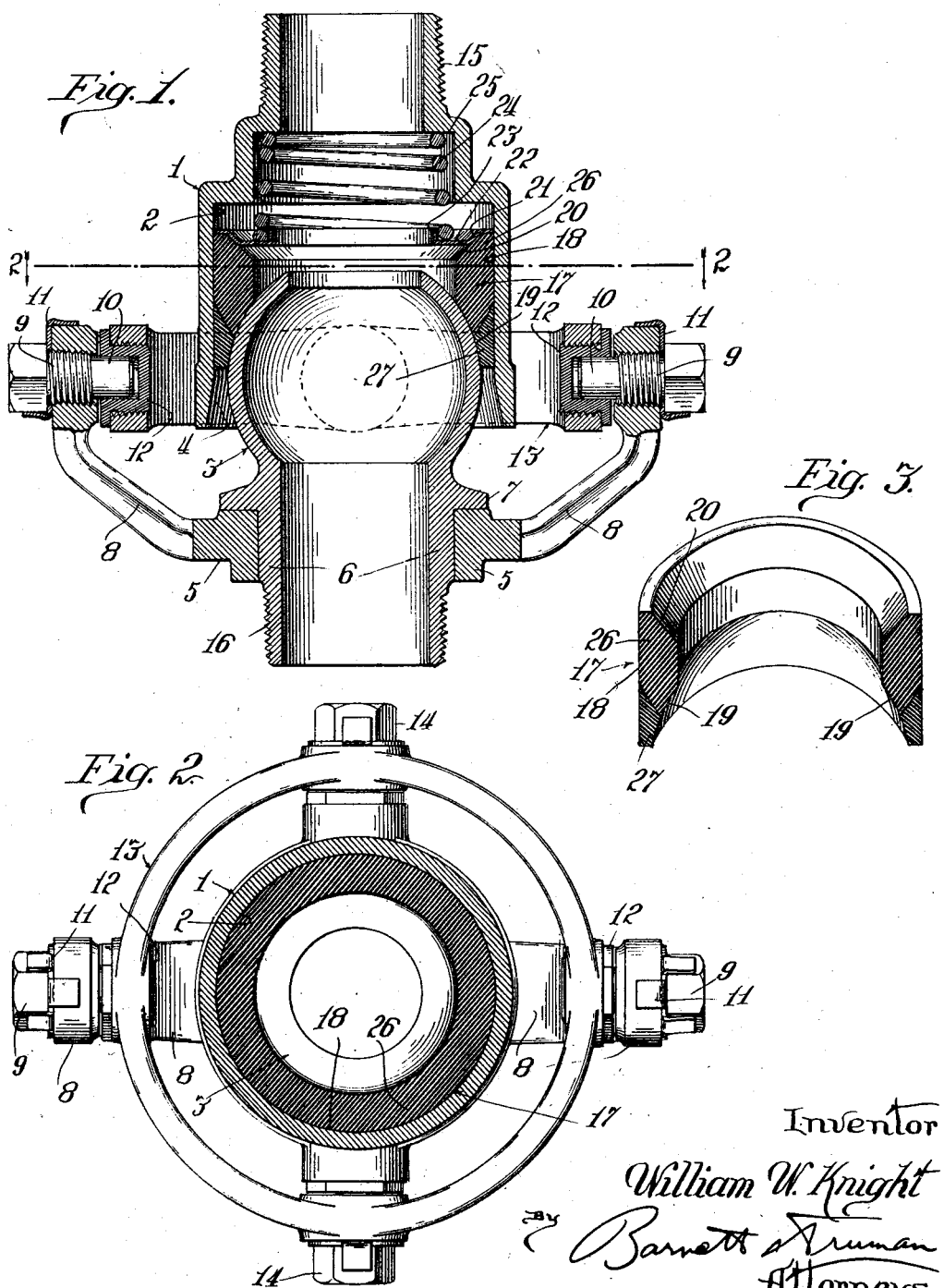
Inventor
William W. Knight
By Barnett & Truman
Attorneys Patented Apr. 21, 1931

1,802,176

UNITED STATES PATENT OFFICE

WILLIAM W. KNIGHT, OF EVANSTON, ILLINOIS, ASSIGNOR TO ROTH RUBBER COMPANY, OF CHICAGO, ILLINOIS, A CORPORATION OF ILLINOIS

GASKET

Application filed September 10, 1927. Serial No. 218,677.

This invention relates to improvements in flexible pipe joints of the type comprising a socket member and a ball member arranged within but spaced slightly from the inner walls of the socket member and articulated with the socket member to allow universal movements between these members, and the invention relates particularly to improvements in the gasket or sealing member which is interposed between the socket member and the inner end of the ball member to maintain a fluid-tight joint at all times.

These flexible pipe connections are intended primarily for use between the steam or air pipes of adjacent cars of a railway train. Such pipe connections must be freely flexible to allow for the relative angular movements of the two cars, and at the same time must maintain a fluid-tight joint. These sealing devices customarily embody a gasket, longitudinally adjustable within the socket number and bearing against the inner end of the ball member. If this gasket is made of sufficiently soft and flexible material to provide an efficient seal aganst the ball and socket members, it does not have sufficient strength to adequately withstand the wear due to the movements of the ball member, and is also apt to soften and flow out under the extreme heat conditions to which it is exposed when used in steam pipes.

The particular object of the present invention is to improve the construction of these gaskets by forming the tapered outer end or tip portion of the gasket of a relatively hard material, such as a phenolic condensation product, the remainder of the gasket being formed of a relatively soft rubber composition adapted to maintain an effective seal both against the ball and socket members. The harder end portion of the gasket which is wedged between the ball and socket members will relieve the softer composition of much of the wear, and will also serve as a stop member or plug to prevent the softened rubber composition from flowing out of the joint when extreme heat conditions prevail.

Other objects and advantages of this invention will be apparent from the following detailed description of a certain approved form of gasket constructed according to the principles of this inventon.

In the accompanyng drawings:

Fig. 1 is a longitudinal, central section through one of the flexible joints equipped with this improved gasket.

Fig. 2 is a transverse section, taken substantially on the line 2—2 of Fig. 1.

Fig. 3 is a sectional, perspective view of the gasket.

Referring to the drawings, the flexible pipe connection comprises a hollow socket member 1, having a cylindrical recess or opening 2 therein, and a hollow ball member 3 centered within the outer portion of recess 2 and having a loose working fit in this recess so that a substantial annular clearance space 4 exists between all portions of the ball and the surrounding portion of the socket member. Articulating means are provided to hold the ball member 3 centered within socket member 1, while at the same time allowing free relative angular and preferably rotative movements between these members. This articulating means comprises a yoke member having an annular collar 5, swiveled upon a neck portion 6 of the ball member 3, behind a shoulder 7, which projects outwardly from this neck portion. Arms 8 of the yoke member extend outwardly at diametrically opposite points from the collar 5 and project forwardly around the ball member. Bolts 9, ending in pivot studs 10, are screwed into the outer ends of arms 8, the studs 10 having a common center line extending through the center of ball member 3. Suitable nut locks 11 maintain the pivot studs in place in the arms 8. Studs 10 are pivoted in bushings 12 of bronze or other suitable bearing metal, which are screwed into the ring member 13 which loosely surrounds the outer end of socket member 1. The ring 13 is pivoted in an exactly similar manner to the socket member 1 on an axis also passing through the center of ball 3 and at right angles to the axis of the studs 10, as already described. For this purpose, bolts 14 are screwed into the ring 13 at points spaced 90° from the bushings 12. These bolts 14 have pivot studs on their inner ends similar to the studs 10, which are in turn rotatable in bearings similar to the bushings 12 which are mounted in the body portion of the socket member 1. By means of the mechanism just described, the ball member 3 is positively centered within the socket member but is permitted a universal angular movement, as well as a free rotative movement, at all times.

The socket member 1 has a threaded tubular extension 15 adapted to be engaged with the adjacent portion of the flexible piping, and the neck portion 6 of the ball member 3 has a corresponding threaded tubular extension 16 adapted to be engaged with another section of this flexible piping.

The sealing device now to be described, forming the principal feature of this invention, is adapted to maintain a fluid-tight joint between the ball and socket members of the flexible pipe connection at all times, without interfering with the free, angular and rotative movement of the ball member within the socket. The gasket 17 has an outer cylindrical surface 18 adapted to slide freely within the recess 2 in the socket member 1. One inner end of the gasket 17 is curved spherically, as shown at 19, to fit against the adjacent end of the ball member 3. At its opposite end, the gasket is inwardly cut away, as indicated at 20, to engage the conical portion 21 of a metallic follower 22. This follower has an inner cylindrical flange 23 serving as a centering device for the compression spring 24, which bears at one end against the follower and at its other end against a shoulder 25 formed in the socket member. The tapered outer end portion of the gasket 17 is normally forced tightly into the joint between the ball and socket members by the expanding spring 24, and also by the fluid pressure existing within the pipe connection. The spring 24 will serve to maintain the gasket in sealing position when the fluid pressure is released.

The main body portion 26 of the improved gasket is formed of a suitable rubber composition, but the extreme outer tapered portion of the gasket, which is forced between the ball and socket members, as indicated at 27, is formed of a much harder material, such as a suitable phenolic condensation product. Preferably the gasket is formed by pressing the two materials together within the same mold, so that they will become permanently united, or vulcanized to one another to form a unitary gasket. The exact proportions of the two materials used in forming the gasket may be varied through a considerable range, but it is preferable that sufficient of the soft material be provided to form a seal both against the inner surface of the socket member and against the outer spherical surface of the ball, as indicated in the drawings.

In operation, the outer hard bakelite edge portion 27 of the gasket will be wedged firmly into the joint between the ball and socket members, but will acquire a smooth polished surface where engaged by the ball, so as not to seriously interfere with tilting movements of the ball member within the socket. The inner, softer portion 26 of the gasket will be expanded both against the ball and socket members to form an effective fluid seal. This inner rubber composition 26 may be considerably softened by the high temperature prevailing within the joint when steam is carried within the pipe connection, but the annular bakelite portion 27 will act as a plug to prevent the softened material from flowing out through the annular clearance space 4. Also the greater portion of the wear caused by movements of the ball member 3 is taken by the hard bakelite portion 27, so that the effective life of the softer rubber composition 26 is greatly increased.

Other materials than those hereinabove described could be used in forming the gasket member, the bakelite and rubber composition here specified being merely examples of materials well suited for this purpose.

I claim:

1. A gasket adapted for use between the ball and socket members of a flexible pipe joint, the gasket being formed with a tapered outer end portion of a phenolic condensation product and a main body portion of rubber composition, the two materials being molded together to form a unitary gasket.

2. An annular gasket adapted to be wedged between two relatively movable surfaces, the main body portion of the gasket being formed of a relatively soft rubber composition, and the tapered edge portion of the gasket which is wedged between the relatively movable surfaces being formed of a phenolic condensation product, the two materials being molded together to form a unitary gasket.

3. A gasket adapted for use between the ball and socket members of a flexible pipe joint, the gasket being formed with a tapered outer end portion of a relatively hard material adapted to be wedged between the ball and socket members, and a main body portion of a relatively soft material adapted to also engage both the ball and socket members behind the hard end portion, the two materials being molded together to form a unitary gasket.

WILLIAM W. KNIGHT.